United States Patent Office 3,435,156
Patented Mar. 25, 1969

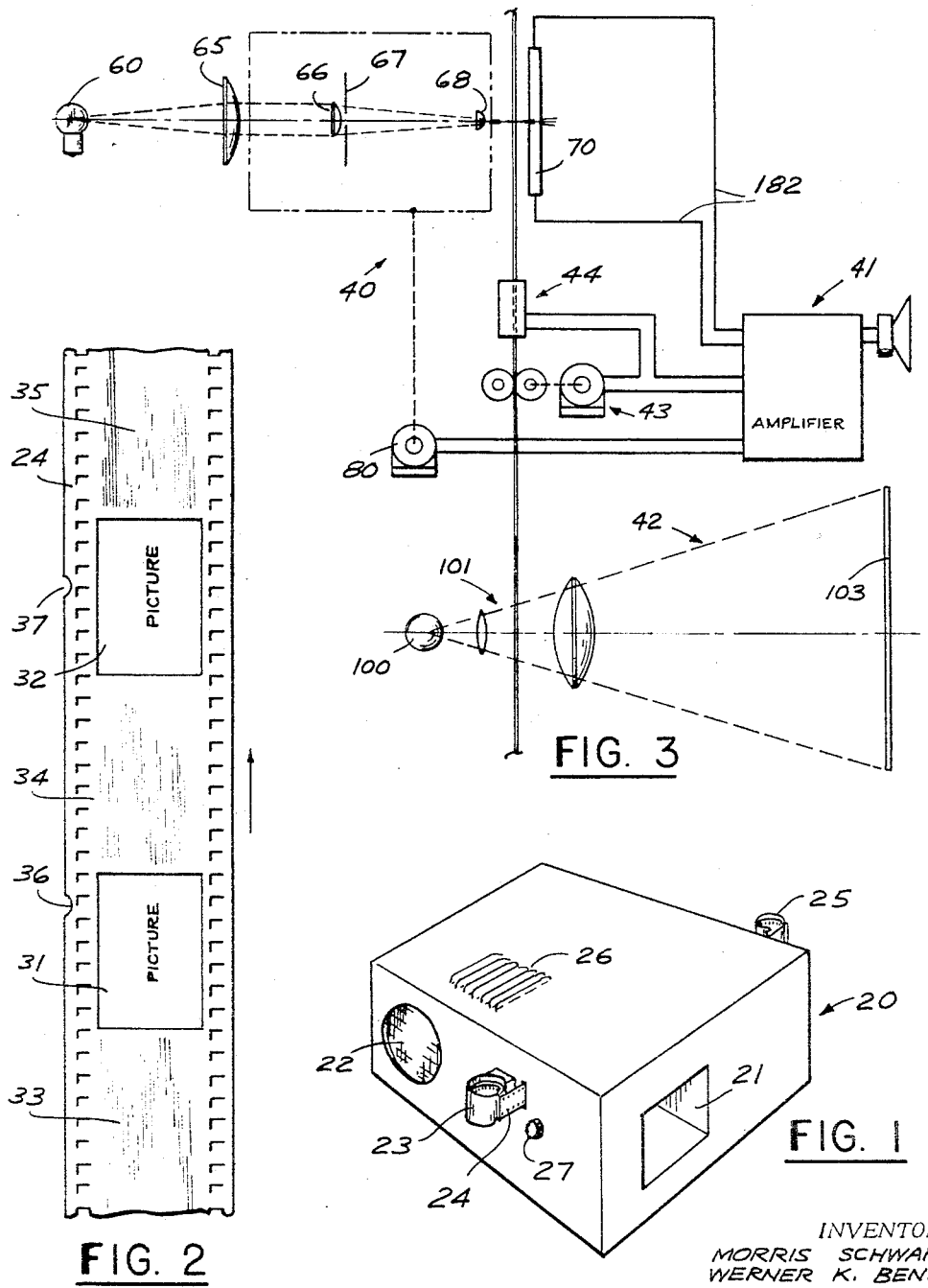

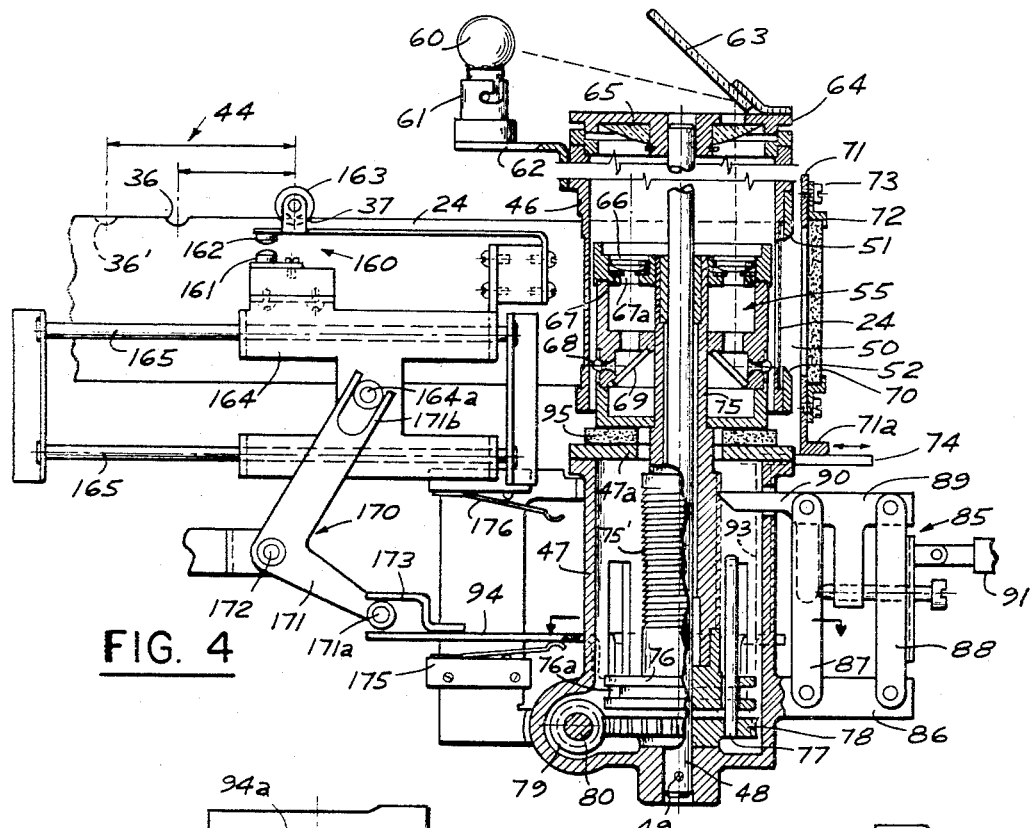

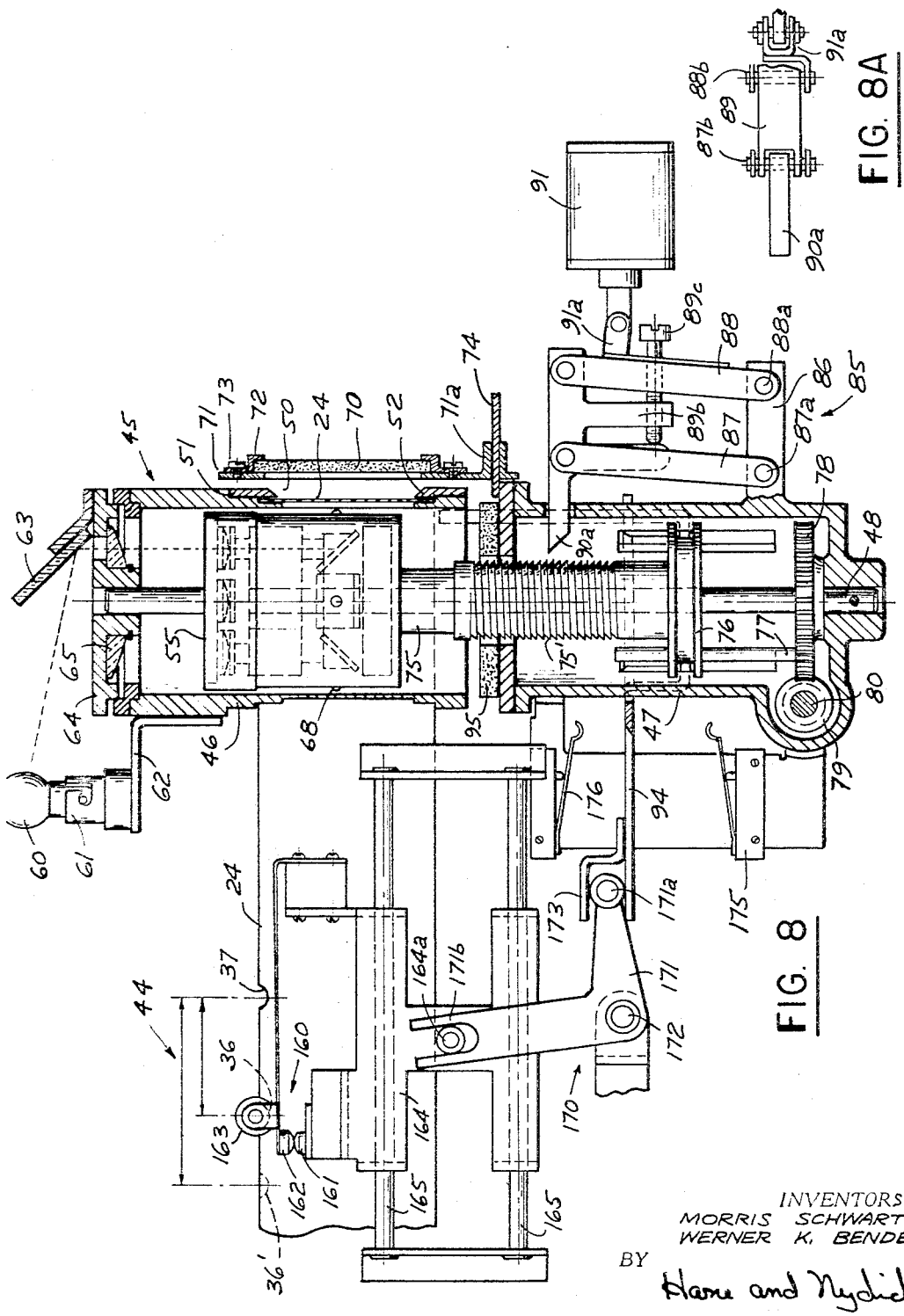

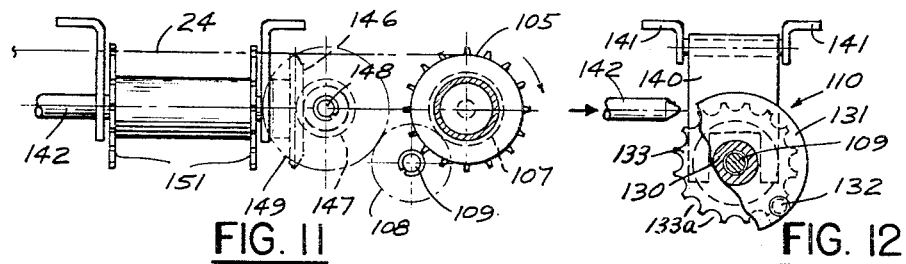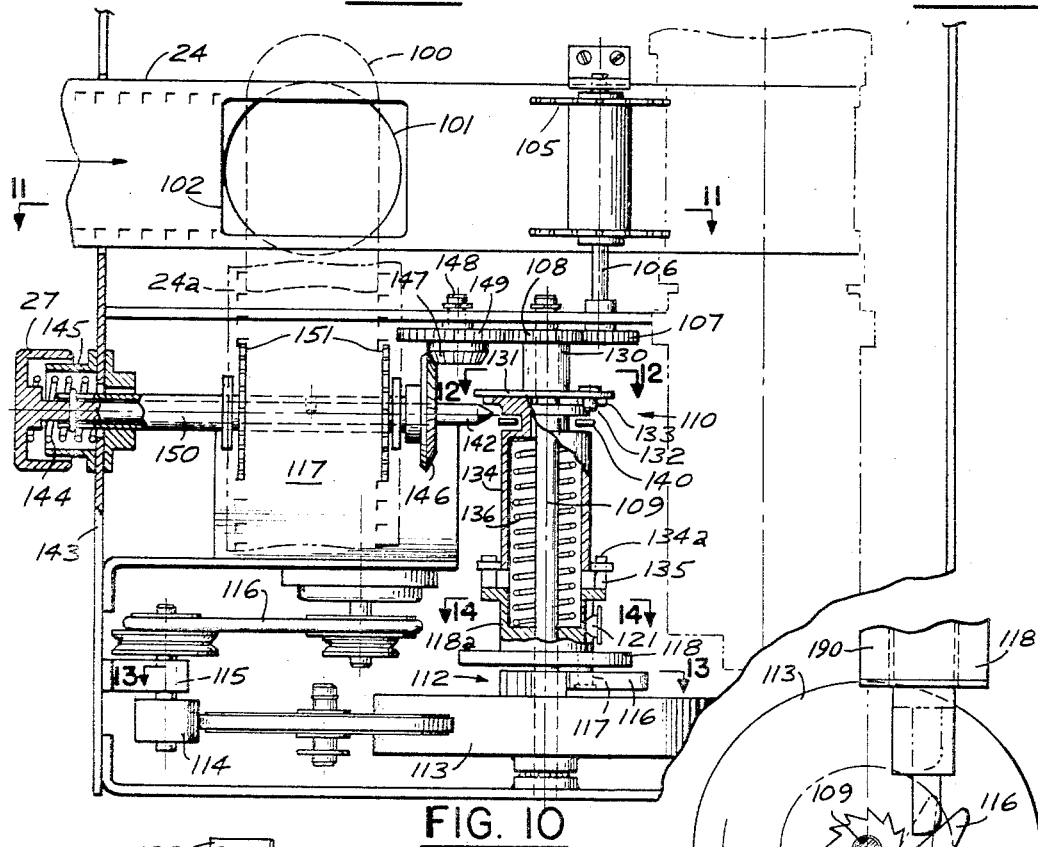

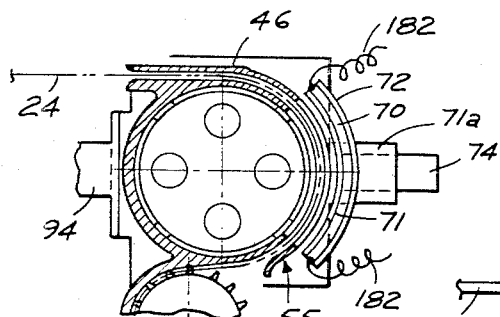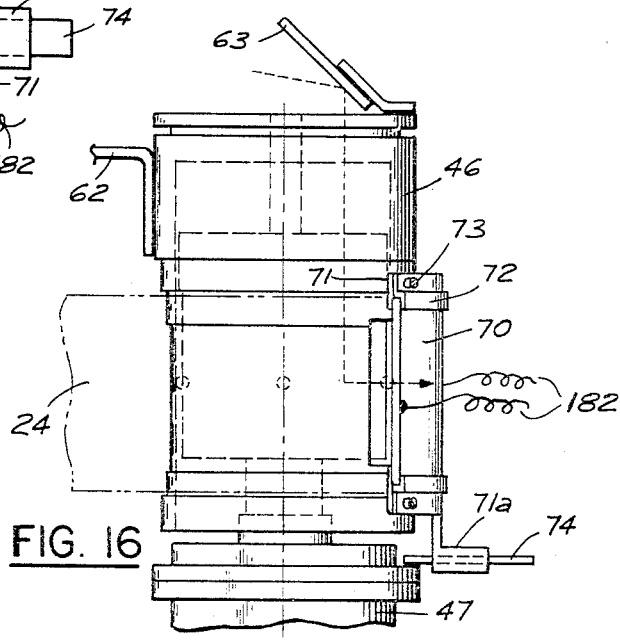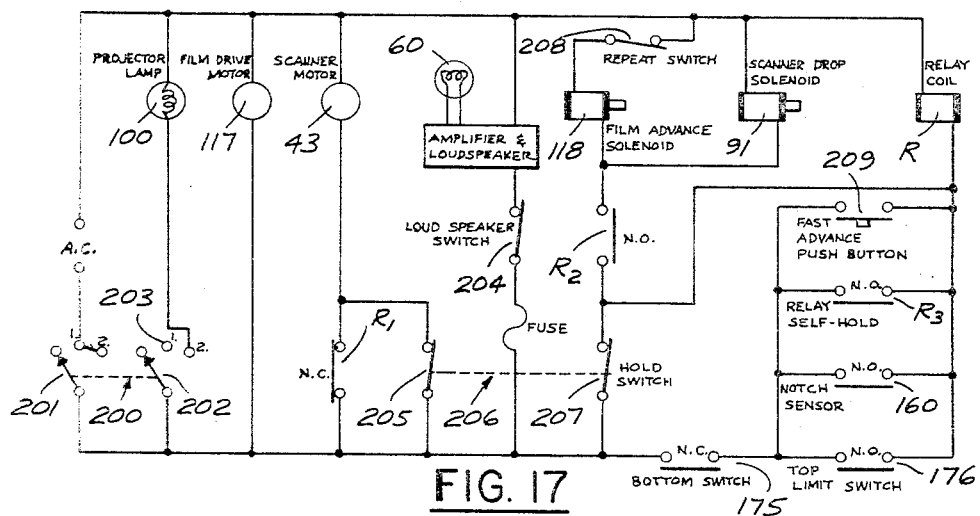

3,435,156
OPTICAL MULTIPLE TRACK SOUND PROJECTOR
Morris Schwartz and Werner K. Bender, Plainville, Conn., assignors to The Kalart Company Inc., Plainville, Conn., a corporation of New York
Continuation-in-part of application Ser. No. 199,411, June 1, 1962. This application Jan. 4, 1966, Ser. No. 518,614
Int. Cl. G11b 7/08, 7/00; G03b 1/24
U.S. Cl. 179—100.3                                        8 Claims

ABSTRACT OF THE DISCLOSURE

There is disclosed a sound projector for playing back sound from a sound record area formed on a strip of film by parallel sound record tracks. A sound record area to be played back is supported in curved guide means which, in turn, are mounted on a stationary housing coaxially therewith. The scanning assembly of the sound projector comprises optical means disposed within the housing rotatable about and lengthwise slidable along the common axis of the housing and the guide means. The source of light, such as a light bulb, for the optical means is inserted in a socket stationarily mounted with reference to the optical means. The socket is disposed so that the light bulb in the socket directs a light beam upon the optical means which, in turn, directs the beam of light upon the sound record area supported in the guide means. Drive means impart to the optical means combined rotary and axial motions, the rates of said motions being so correlated that the beam of light sequentially scans the parallel sound tracks on the sound record area.

---

The present invention relates to a sound projector for reproducing and projecting from a strip of film bearing sound record areas and picture areas.

The present application is a continuation-in-part application based upon our co-pending application, Ser. No. 199,411, filed June 1, 1962, and now issued as Patent No. 3,232,167.

A strip of film of this kind generally bears several picture areas and associated sound record areas. Each picture area and the associated sound record area constitute a program, and it is generally necessary or at least desirable to present several programs in succession and to effect automatically the changeover from one program to another program upon completion of the projection and reproduction respectively of one program. More specifically, the present invention relates to improvements on sound projectors as disclosed in prior Patents 3,001,030 and 3,001,444.

In sound projector designs as disclosed in the aforesaid two patents, the exciter lamp of the scanning assembly of the projector is mounted on and within the projector drum which also mounts the scanning lenses of the scanning assembly, and the light from the exciter lamp impinges directly upon the scanning lenses. In such an arrangement, the exciter lamp moves rotationally and axially in unison with the drum and thus participates in the drop of the drum upon completion of each scanning operation. The resulting repeated jolts to which the exciter lamp is subjected tend to shorten the life of the lamp and may also affect the light output of the same due to slight deformations of the filament of the lamp. Replacement of the exciter lamp is rather expensive and inconvenient, especially for laymen who are expected to attend to routine servicing of the projector. Furthermore, replacement of the exciter lamp may affect the characteristics of the sound reproducing system of the projector and, in particular, the quality of the sound reproduction.

Exciter lamps as now available in the market are rarely fully alike. There may be, and usually are, imperfections in the envelope of the lamp, such as striations and bubbles, and the configuration of the lamp filament tends to vary from lamp to lamp. Such imperfections and variations, even though they may be minute and well within a narrow manufacturing tolerance range, have a marked optical effect upon the image of the filament as seen by the scanning lenses, especially when the light of the lamp impinges directly upon the lenses. The aforementioned irregularities cannot be controlled; they vary from lamp to lamp and may cause distortion of the sound reproduction. The dissipation of the heat of an exciter lamp mounted within the drum, as is the lamp of the aforementioned prior patents, also presents manufacturing problems.

It is a broad object of the invention to provide a novel and improved sound reproduction assembly for a projector of the general kind above referred to in which the effect of the light as received by the scanning lenses is substantially constant even when the exciter lamp is replaced.

A specific object of the invention is to provide a novel and improved sound reproduction assembly for a sound projector of the general kind above referred to in which the optical components of the sound reproduction assembly neutralize the effect of any variations of the filament image in respect to the light impinging upon the scanning lenses.

Another specific object of the invention is to provide a novel and improved sound reproduction assembly for a sound projector of the general kind above referred to in which the life expectancy of the exciter lamp is substantially greater than those of an exciter lamp mounted as disclosed in the aforesaid prior patents.

Still another specific object of the invention is to provide a sound reproduction assembly for a sound projector of the general kind above referred to in which the dissipation of the exciter lamp is greatly facilitated.

The modulation experienced by the light directed by the scanning lenses of the sound reproduction assembly upon the sound record area to be scanned and passed through the same, is sensed by light sensitive means which control suitable sound reproducing means in a conventional manner.

One of the problems with sound reproduction assemblies of sound projectors of the general kind above referred to is that the sound record area to be scanned is comparatively large in reference to the light sensitive area of the conventionally used light receivers, such as photocells. Accordingly, it is necessary to interpose light deviating means between the sound record area and the photocell and to displace these light deviating means in synchronism with the axial displacement of the scanning lenses when and while the same scan the sound record area so that the modulated light will strike the light sensitive area of the photocell in all axial positions of the scanning lenses. The arrangement of such light deviating means and the positional control thereof contribute substantially to the complexity and the costs of the projector.

Accordingly, it is another broad object of the invention to provide a novel and improved sound reproduction assembly for a projector of the general kind above referred to which does not require special position controlled light deviating means for directing the modulated light to the light receiver of the assembly.

A more specific object of the invention, allied with the next preceding one, is to provide a novel and improved sound reproduction assembly in which the light receiver receives the modulated light directly and is stationarily mounted in reference to the sound record area, thereby greatly simplifying the projector.

Other and further objects, features and advantages of the invention will be pointed out hereinafter and set forth in the appended claims constituting part of the application.

In the accompanying drawing, a preferred embodiment of the invention is shown by way of illustration and not by way of limitation.

In the drawing:

FIG. 1 is a perspective view of a sound projector according to the invention;

FIG. 2 is a fragmentary view of a strip of film suitable for use in the projector of the invention;

FIG. 3 is a diagrammatic view of the scanning assembly and the sound projecting assembly of the invention;

FIG. 4 is a fragmentary sectional view of the sound projector showing the scanning assembly thereof and part of the control means for controlling the scanning assembly and the film transport means;

FIG. 5 is a plan view of a component of the scanning assembly according to FIG. 4;

FIG. 6 is an elevational view of FIG. 5;

FIG. 7 is a section taken on line 7—7 of FIG. 4;

FIG. 8 is an elevational, sectional view similar to FIG. 4, but showing the scanning assembly and the control means in a different operational position;

FIG. 8A is a fragmentary plan view of FIG. 8;

FIG. 10 is a sectional view of another part of the film transport means;

FIG. 11 is a section taken on line 11—11 of FIG. 10;

FIG. 12 is a section taken on line 12—12 of FIG. 10;

FIG. 13 is a section taken on line 13—13 of FIG. 10;

FIG. 14 is a section taken on line 14—14 of FIG. 10;

FIG. 15 is a fragmentary cross sectional view of a modification of the scanning assembly;

FIG. 16 is an elevational view of the modification of FIG. 15; and

FIG. 17 is a circuit diagram of the electric components of the sound projector according to the invention.

Figure 9:
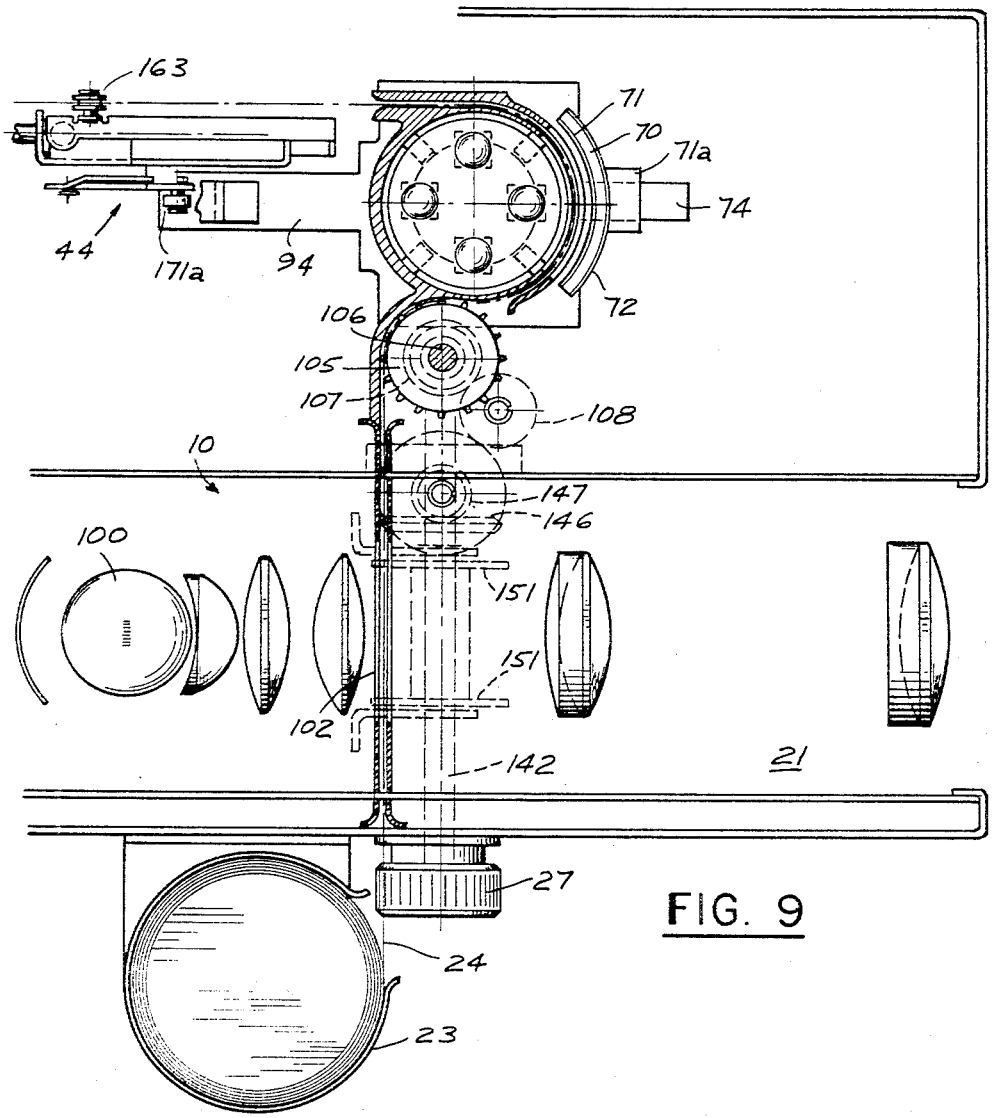
FIG. 9 is a cross sectional view of the sound projector, showing part of the film transport means and of the picture projecting assembly and also of the control means.

Referring first to FIG. 1, this figure shows the entire projector mechanism as being enclosed in a housing 20 of generally rectangular configuration. However, it should be understood in this connection that the shape of the housing as shown in FIG. 1 is not significant for the invention; that any other suitable configuration of the housing may be provided. Housing 20, as shown in FIG. 1, has in its front wall a gate or window 21 from which the light beam of the projector may emanate. There is further shown an opening 22 for the loudspeaker, a supply reel 23 for a strip of film 24 on which the material to be projected and reproduced is printed and a take-up reel 25 for the film. Louvers 26 in the top wall of the housing and, if necessary, also in other walls of the housing facilitate dissipation of the heat. Finally, FIG. 1 shows a button 27 which serves to operate the film centering means of the projector, as will be more fully explained hereinafter. In addition, there will be one of several buttons (not shown) for control of the switches and other electric components of the projector.

FIG. 2 shows a typical strip of film which may be used for projection and reproduction in a sound projector according to the invention. In this connection, reference is made to prior Patent 3,001,444 in which is shown and fully described a film strip of the kind here involved. It suffices to state for the purpose of this application that the film strip 24 should be visualized as a conventional strip of 35 mm. motion picture film, but it may also be a strip of greater or lesser width such as 70, 16 or 8 mm. The strip bears a number of picture areas, two picture areas 31 and 32 being shown and a corresponding number of sound record areas, three areas 33, 34 and 35 being shown. Each picture area is associated with a sound record area and each pair thus formed constitutes a program; a number of programs may be provided on a strip. The picture areas and sound record areas are shown to be disposed alternating and in longitudinal spacing, but other spatial relationships of the picture areas and the sound record areas, such as placement thereof in two rows or in superimposition, are also feasible. It should further be understood that an associated picture and the associated sound record area need not be next adjacent to each other. In actual practice, one or several picture areas and sound record areas may be interposed between a picture area and the associated sound record area to facilitate projection and reproduction in the projector, as will appear more fully from the subsequent description. When the picture areas and the sound record areas are placed in parallel rows, the respective areas in the two rows may be staggered in reference to each other.

The picture and sound record areas should be visualized as being produced upon the film by any suitable means, for instance, by photographic printing. Each sound record area consists of a plurality of sound track sections which in toto constitute the recording of a continuing message if sequentially scanned, starting, for instance, with the lowermost track section and continuing with the beginning of the next adjacent track section after completing the scanning of the preceding track section. The track sections are slightly slanted in reference to the longitudinal edges of the strip of film so that the track sections, when brought into a curved configuration in the projector, constitute parts of a helical line. The track sections may either occupy the entire available area or only part thereof, depending upon the length of the recorded message. The track sections may be recorded either by the variable density method or the variable area method. As may be noted, notches 36 and 37 are provided in one of the longitudinal edges of the strip of film. Each of the notches is associated with one of the sound record areas. For instance, notch 37 may be associated with sound track area 34. The notches are so correlated with the sound record areas that the location of each notch is indicative of the length of the recorded message on the respective sound record area, or in other words, each notch is an indication when the program of which the respective sound area constitutes a part is completed. The notches are used to control the film transport mechanism of the projector, as will be more fully explained hereinafter.

Turning now to FIG. 3 indicating diagrammatically the basic components of the projector, there is shown a scanning assembly 40 for scanning the sound track sections, a sound producing assembly 41, an optical system 42 for projecting the pictures on the strip of film, film transport means 43 for transporting the film through a predetermined distance upon completion of the program and control means 44 for controlling activation of the film transport means upon completion of a program.

The scanning assembly

The structural arrangement of the scanning assembly 40 is best shown in FIGS. 4, 7 and 8. The parts of the projector constituting the scanning assembly, or being directly associated therewith, comprise a tubular casing 45 which has an upper part 46 and a lower part 47. Both parts are generally disposed in upright position and are joined by a rod 48 which extends through the entire length of both parts and is secured by any suitable means to housing part 47 at 49. Both housing parts 46 and 47 are stationary in reference to each other and rod 48. The upper part 46 has in its wall a scanning gate 50 along the longitudinal rims of which guide members 51 and 52 define guide channels for film 24 when passing past the scanning gate. As is evident, the film and with it the sound record areas thereon are constrained to a semicylindrical configuration when passing through the gate. The specific arrangement of the film guide means does not constitute part of the present invention and reference is made for a more detailed description to aforementioned Patents 3,001,030 and 3,001,444.

The stationary outer housing 46–47 accommodates a scanning drum 55, which is rotatable and axially slidable within the housing and is guided by and along rod 48. More specifically, the drum is movable within the upper housing part 46. It is shown in FIG. 4 in its lowermost position and in FIG. 8 in a raised position. The lowermost position of the drum is a spatially fixed one and corresponds to the beginning of a scanning operation. The raised position of the drum signifies the end of a scanning position. It is not a fixed one, but depends upon the area occupied by the track sections of the sound record area being scanned.

Drum 55 performs its rotational and axial movement during each scanning operation. More specifically, it is lifted from its lowermost position at the beginning of a scanning operation (see FIG. 4) into its uppermost position at the end of the scanning operation (see FIG. 8, which may be considered to show the uppermost drum position for the purpose of this specification). The drum performs a rotational movement while being lifted and at the end of the scanning operation, its return automatically to its lowermost position by the force of gravity.

The drive means for effecting the combined movements of the drum and the control means for controlling the drum movements will be explained more fully hereinafter.

The optical means of the scanning assembly comprise stationary optical components supported by housing part 46 and movable optical components which participate in the rotational and axial movements of the drum.

Referring to FIGS. 3, 4 and 8, light for the scanning assembly is supplied by an exciter lamp 60, shown as an incandescent bulb, preferably a bulb which has a flat filament of square shape, as is indicated in FIG. 3. Lamp 60 is shown to be inserted into a socket 61, which is secured to housing part 46 by any suitable means, such as a bracket 62. The light emanating from the lamp is reflected by a 45 degree angle mirror 63 secured to a cover 64 of housing part 46, upon a lens 65 mounted within housing cover 64. Lens 65 is shown as a doughnut-shaped lens, rod 48 extending into the center hole of the lens. In this connection, it should be mentioned that lamp 60 may be mounted in alignment with lens 65 rather than laterally spaced therefrom, in which event mirror 63, or a similar light-deviating means, may be omitted. It is further possible to mount the exciter lamp independently of the housing. It is only essential that the lamp is stationarily mounted, i.e., that it does not participate in the movements of drum 55. Lens 65 projects the filament of lamp 60 into infinity. The projected light impinges upon lenses 66. There is shown one pair of lenses, but in actual practice, several pairs, such as two pairs, should be provided, spaced 90 degrees apart. Immediately posterior of each lens 66, a mask 67 is mounted, including a slit 67a. Lenses 66 collect the light incident upon them at a focal point and the respective slits 67a will appear to be evenly illuminated as viewed from the focal point of each lens 67. At the focal point of each lens, there is located another lens 68. The light emanating from the slits 67a is directed by a light deviating means, such as a mirror 69, upon the respective lens 68. However, it should be understood that the focal distance between each lens 66 and the respective lens 68 is represented by the combined distance between the lens 66 and the respective mirror 69, plus the distance between mirror 69 and lens 68. Lenses 68 constitute the scanning lenses proper. The specific manner in which the scanning of a sound track area is performed by the light projected by the lenses does not constitute part of the present invention. Lenses 68 correspond to lenses 30 of prior Patents 3,001,030 and 3,001,444. Reference is made to the detailed description of the scanning operations in these patents, for instance, to 3,001,030, column 5, lines 65 and following.

The light beams emanating from lenses 68 are modulated by traversing the sound track recorded on film 24 and the modulated beams impinge upon a photoconductive cell 70. The photoconductive area of the cell is preferably at least equal to the area of the sound record area to be scanned and is formed by a layer of a suitable photosensitive material. Among the materials best known and suitable for the purpose are cadmium sulfide (CdS) and cadmium selenide (CdSe). These materials have somewhat different characteristics. Cadmium sulfide has its spectral peak sensitivity at 5,000 A. and cadmium selenide at 7,300 A.

The spectral sensitivity of the aforementioned photosensitive materials controls the "speed of the material," that is, the speed with which changes in the light energy striking the material causes changes in resistance. For scanning purposes of the kind herein referred to, it is desirable to provide a fast photoconductor, that is, a conductor, the resistance of which follows changes in light practically immediately. Cadmium selenide in such conductor, but unfortunately, the spectral sensitivity of cadmium selenide peaks in the near infra-red. Sound tracks as used in accordance with the invention are transparent in the near infra-red and hence, will not cause a modulation of the light. It has been found that mixing of cadmium selenide and cadmium sulfide permits a convenient shifting of the spectral sensitivity peak to any desired place between the aforementioned peak frequencies of these two materials. In other words, a sensitivity peak may be selected at which the photoconductor is still satisfactorily fast, but is sufficiently removed from the infra-red part of the spectrum to respond to the light modulations incident thereupon.

As it is well understood, a photoconductive cell is, in effect, a resistor whose values are inversely proportional to the variations of light energy (photons) which strike the face of the cell. The cell has two electrodes separated by, and in contact with, the photoconductive material. Light, such as the light modulated when passing through the sound record area being scanned, changes the energy barrier formed by the photoconductive material and such change results in changes in the current between the two electrodes, for a fixed voltage. The photoconductive cell 70, which is only diagrammatically shown in FIG. 4, is detachably mounted in a frame 71 by means of brackets 72 secured to the frame by suitable fastening means, such as screws 73. The entire cell assembly is slidably supported by two parallel guide bars 74 (only one guide bar being visible in FIG. 4). A bushing 71a, extending from frame 71, engages the guide bars preferably with a frictional grip to secure the cell assembly in any selected position of displacement on the guide bars. The guide bars themselves are secured to a suitable and convenient part of the housing, such as cover plate 47a.

As it is evident from FIG. 4, the entire cell assembly is movable between the illustrated operational position in which the cell or, more specifically, the photosensitive layer thereof is closely adjacent to the sound track area to be scanned facing the same and in parallel relationship therewith and a film loading position in which the cell assembly is well spaced from the sound track area and guide 51 and 52 in which the film portion bearing the sound track area is held. As it is further evident, the cell assembly is supported only at its lower end. Such mounting of the cell assembly facilitates the insertion of the film into the projector and removal therefrom. When the cell assembly is placed in the loading position, the film can be conveniently dropped from above into its position for visual presentation and sound reproduction, since the top part of the cell assembly is free of obstructing support elements for frame 71. This has the advantage that the projector will readily accept a film in the form of a prepared endless loop for continuous or repeat presentation.

Moreover, it permits the use of a film stored in a separate cartridge which can be dropped by the user into its position in the projector, without requiring splicing of the film into a loop, threading of the film or extensive manual handling. The photoconductive layer of the cell is directly connected by wires 182 to an amplifier-loud speaker assembly 41. This assembly should be visualized as being of conventional design. The amplifier of the assembly may be a solid state amplifier. The connections between the cell and the assembly 41 may be made by printed circuits. Such circuits may, of course, also be used within the assembly itself. The sound reproducing equipment as such does not constitute part of the invention and should be visualized to be conventional and for further description, reference is made to the aforesaid two patents.

Transport means for the scanning assembly

To effect the aforedescribed, combined axial and rotational movement of drum 55, the drum is fixedly secured to a tube or spindle 75 for movement of the drum in unison with the tube or spindle. The lower end of the tube which extends into the lower part 47 of the outer stationary housing is externally threaded at 75' and mounts at its lower end a disc 76 formed with a peripheral groove 76a. The spindle and the drum assembly are axially and rotationally slidable on the rod 48. Disc 76 is formed with an opening 76b through which a driving rod 77 is slidably extended. The driving rod is secured to a gear 78 which is in mesh with a worm 79 fixedly seated upon a shaft of a motor 80, diagrammatically indicated in FIG. 3. As is evident, the coupling between gear 78 and disc 76 as formed by rod 77 causes a rotation of the drum assembly when gear 78 is driven while permitting axial displacement of the drum assembly when and while the assembly is rotated.

The axial movement is imparted to the drum assembly by means of a linkage assembly 85 mounted on a bracket 86 extending from the lower housing part 47. The assembly comprises two arms 87 and 88 pivotally mounted on bracket 86 by means of pivot pins 87a and 88a. The upper ends of the two arms are pivotally linked to a T-shaped member 89 by means of pivot pins 87b and 88b, so that bracket 86, arms 87, 88 and the cross arm of T-member 89 constitute a parallelogram. Pivot pin 87b further seats an L-shaped member 90. Arms 90a of this member terminates in a wedge or tooth which is movable into and out of engagement with threads 75' on tube 75. As is evident, engagement of the tooth of arm 90a with the threads will cause the drum assembly to rise when and while it is rotated. The other arm 89b of member 89 is engageable with an adjustment screw 89c extending through arm 88 and threaded through a bore in the long arm of T-member 89. Screw 89c permits a fine adjustment of the rise of the scanning drum during a scanning operation. Turning of screw 89c into one or the other direction will cause a corresponding pivoting of L-member 90 about its pivot pin 87b, thereby correspondingly changing the thread which is engaged by the tooth when the linkage assembly 85 is tilted in counterclockwise direction as seen in FIG. 8A. The linkage assembly is controlled by the state of energization of a solenoid 91, which is coupled to the linkage assembly by any suitable coupling means, indicated at 91a.

To return the drum assembly from the lifted position of FIG. 5 into the lowermost position of FIG. 4, toothed arm 90a is disengaged. As a result, the drum assembly will fall back into the lowermost position by the force of gravity. To soften the impact of the drum assembly upon a cover plate 47a of housing part 47, a cushion 95 is preferably provided.

As is evident, the exciter lamp 60 does not participate in the upward or downward movements of the drum assembly and hence is not subjected to any jar when the drum assembly returns into its lowermost position.

Picture projecting means

The picture projecting equipment 42 of the projector does not constitute part of the present invention. It is shown diagrammatically in FIG. 3 and more in detail in FIG. 9. It comprises a projection lamp 100 and a lens system 101 of suitable design. The picture may be projected through a picture gate 102 upon a suitable screen 103.

Film transport means

As has been explained in connection with FIG. 2, there are provided on the strip of film a plurality of programs, each consisting of a picture gate and an associated sound record area. The picture area and the sound record area for each program are uniformly spaced. To reproduce a program, the sound area thereof must be located in registry with scanning gate 50 and photocell 70 and the picture area in registry with the picture gate 102. To ready the projector for a new program, the strip of film must be transported through a distance such that the two areas of the new program (which is not necessarily the one directly following the program just produced) are in registry with the respective gates.

The film transport means are best shown in FIGS. 9 through 14. The film is driven by a sprocket 105 mounted on a shaft 106 which also seats a gear 107. Gear 107 is in mesh with a gear 108, rotatably mounted upon a stationary guide rod 109 and secured to a sleeve 130, releasably coupled to a sleeve 134 by a coupling 110. Sleeve 130 is also rotatable about guide rod 109. The lower end of sleeve 134 is joined to a collar 118a for rotation in unison therewith, but is lengthwise slidable in reference thereto. Sleeve 134 is joined to the collar by one of several pins 135 protruding from a flange of collar 118a and slidably extended through corresponding bores 134a in a flange of sleeve 134. Collar 118a is secured to a disc 118, which is releasably coupled by a coupling 112 to a driven wheel 113 frictionally engaged by a wheel 114. Wheel 114 is seated on a shaft 115 coupled by a belt 116, or other suitable transmission means, to a second motor 117. As is apparent, the rotation of the motor will be transmitted to wheel 113 and, assuming both couplings 110 and 112 are engaged, to sprocket 105. Of course, a gear drive instead of a friction drive may be provided.

Coupling 112 comprises a ratchet 115, fixedly secured to wheel 113 for rotation in unison therewith, and a pawl 116 pivotally mounted on a pin 117 secured to collar or disc 118. As can best be seen in FIG. 13, rotation of wheel 112 will be transmitted to sleeve 134 when pawl 116 is in engagement with ratchet 115. A spring 116a biases the pawl into engagement with the ratchet. The pawl is movable out of engagement by actuation of a solenoid 190. The control of the solenoid will be more fully explained hereinafter.

As is evident, it is essential for the correct location of the picture area and the associated sound record area in respect to the respective gates that the transmission assembly 118, 118a, 134 and 130 is accurately and instantly stopped when coupling 112 is disengaged. To assure such stoppage, a detent 118b is provided in collar 118a on disc 118. The detent is engageable by a nose 121 secured to one end of a leaf spring 122, the other end of which is stationarily mounted at 123 in the housing of the projector. Engagement of the nose with the detent will arrest collar 118 and with it the entire transmission assembly always in the same position.

Coupling 110 is part of an assembly permitting manual adjustment of the film in respect to the gates. Such adjustment is generally necessary at the beginning of the showing of a program and it may also be used to turn film 24 through a selected distance, for instance, when it is desired to skip certain programs. Coupling 110 is shown in detail in FIG. 12. It comprises a coupling flange 131 secured to sleeve 130. A coupling pin 132 depending from flange 131 is engageable with any one of a plurality of peripheral grooves 133a formed in a coupling disc 133 secured to or integral with sleeve 134, which is coupled with sleeve 118a rising from disc 118. A coil spring 136 abutting at one end against disc 118 and at the other end against disc 133 urges sleeve 134 upwardly, i.e., into engagement with pin 132, depending from flange 131 so that a rotation of disc 118 is transmitted to sprocket 105, disc 118 being rotated when coupling 112 is engaged as previously described.

To effect disengagement of coupling 110, a springy tongue 140 is provided. This tongue is stationarily secured at one end by any suitable means, indicated as brackets 141, and is bifurcated at its other end to straddle sleeve 134 which is grooved for the purpose. A preferably pointed actuating rod 142, which is mounted axially slidable and rotatable in a casing wall 143, serves to depress tongue 140 by engagement therewith. As can best be seen in FIG. 12, movement of rod 142 in the direction of the arrow forces sleeve 134 downwardly to disengage pin 132 from the engaged groove of disc 133, thereby interrupting the transmission of the rotation of sleeve 134 to sleeve 130.

Rod 142 is urged by a spring 144 out of engagement with tongue 140. The rod supports, at its end, the cap-shaped button 27 which is slidably and rotatably guided on a collar 145 secured to casing wall 143. Rod 142 seats a beveled gear 146 which is in engagement with a second beveled gear 147 mounted on a shaft 148 also seating a gear 149. The latter gear is in mesh with the aforedescribed gear 108 in the gear train for transporting film 24 by means of the motor drive 117.

As is now evident, pressure exerted upon button 27 disengages coupling 110 and also permits turning of film sprocket 105 through gear train 146, 147, 149, 108 and 107 for either initially placing a picture area and a sound record area in alignment with the respective gates, or for moving any selected program into registry with the gates.

Rod 142 or, more specifically, a sleeve 150 mounted on the rod, seats a pair of sprockets 151 for moving a strip of film 24a in vertical direction past a second picture gate 102a.

While the horizontal advance and the scanning of film 24 are automatically controlled, as will be more fully described hereinafter, it is sometimes desirable to be able to project a series of picture areas without accompanying sound. This can be effected by coupling sleeve 150 through the aforedescribed transmission means to motor 117 for vertical drive of film 24a. Of course, no automatic projection or reproduction is possible while film 24a is being transported through the apparatus.

*Control means for controlling the operations of the scanning assembly and the film transport means*

The operation of the scanning assembly at the beginning and the end of each scanning of a sound record area and the operation of the film transport means to place a new program in position for projection and reproduction are automatically controlled by signals derived from the film.

As has been explained in conjunction with FIG. 2, the film has along one of its edges longitudinal marginal notches 36 and 37, each being indicative of the length of the message recorded on an associated sound record area.

Referring now to FIGS. 4 through 6, 8 and 9, there are shown in FIGS. 4 and 8 on film 24, two notches 36 and 37, each marking the end of the sound track sections on a respective sound track area. As may be noted, the notches 36 and 37 are shown closer to each other than they are shown in FIG. 2. This indicates that the message with which notch 36 is associated is a rather brief one and that, hence, the track sections on that area occupy only a comparatively small part thereof. To illustrate further the dependency of the locations of the notches upon the area occupied by the track sections on the respective sound record area, there is indicated in dotted lines a notch 36′ which would be the correct location of notch 36, if the track sections would occupy substantially the entire available sound track area.

The notches are utilized to control a switch 160. The switch has a stationary contact 161 and a spring contact 162. The spring of contact 162 also mounts a trolley 163 riding along the edge of film 24. As long as the trolley rides along an un-notched part of the film, contacts 161 and 162 are separated from each other, as is shown in FIG. 4, but when the trolley reaches a notch and drops into the same, contacts 161 and 162 engage each other, as is shown in FIG. 8. Both contacts are mounted on a carrier 164, which is guided on track rods 165, parallel to a plane in which film 24 is located and moves when driven by the transport means, as previously explained.

The position of carrier 164 in reference to film 24 and, more specifically, to the notches therein, is controlled by the axial position of drum 55 in stationary housing 46, 47. To transmit the axial movement of the drum during a scanning operation to the carriage, a transmission means 170 is provided. This transmission means is shown as comprising a bell crank lever 171 pivotal about a stationary mounted pivot 172. One arm of lever 171 is linked to a plate 94 by means of a guide flange 173 forming a pocket into which extends a roller 171a. The other arm of lever 171 is linked to carriage 164, by means of a guide pin 164a on carrier 164 and a bifurcated portion 171b on the lever. Plate 94 has a central cut-out 94a into which four depending tongues 94b radially protrude, as it is best shown in FIGS. 5 and 7. These tongues engage the peripheral groove 76a in disc 76. Accordingly, an upward movement of the drum assembly, as previously described, causes a correspondingly lifting of plate 94. Hence, lever 171 is turned in counterclockwise direction from the position of FIG. 4 towards the position of FIG. 8 as the scanning operation progresses. Consequently, carrier 164 and its trolley 163 move toward notch 36. The trolley is shown in FIG. 4 in a position in which contacts 161 and 162 are separated. It continues its travel along the edge of the film until it reaches notch 36 and settles in same, whereby contacts 161 and 162 become closed.

In addition to switch 160, the position of plate 94 also controls a lower limit switch 175, which is a normally closed switch, and an upper limit switch 176, which is a normally open limit switch. Switch 175 is opened when and while drum 55, and hence plate 94, are in the lowermost position, but closes as soon as the rise of bracket 94 begins. Switch 176 is closed by engagement with plate 94. The upper limit switch is in the nature of a safety switch. While the opening or closing of switch 175 is necessary for the control of the operation, the operation of switch 176 is not required for normal operational control, as will appear from the subsequent discussion of circuit system shown in FIG. 17. The purpose of switch 176 is to prevent damage to the mechanism by causing drop of drum 55 to its lowermost position and with it of plate 94, if the drum should overrun for any reason its proper or uppermost position.

*The electric circuit system of the projector*

An automatic presentation of successive programs requires that the sound record area of the program first to be presented is scanned by the combined rotational and axial movement of drum 55 while the film is stationary; that at the end of the presentation, scanning is discontinued and the drum is returned into its initial position; that the film is transported through a distance such that a new program is placed in position for scanning and that the drum is again activated for a scanning operation.

Turning now to FIG. 17, the symbols for the heretofore described electric circuit components of the projector are designated by the same reference numerals.

To start operation, main switch 200 is operated. This switch is a two-position switch and has ganged switch arms 201 and 202. In the first position of the switch, switch arm 201 connects film drive motor 117, scanner motor 43 and loudspeaker system 41 (provided on-off switch 204 is closed) to a power line, thereby starting motors 117 and 43 and energizing the loudspeaker system, and switch arm 202 engages a dead contact 203. In the second position of the switch, projector lamp 100 is connected to the power line. The circuit of the scanner motor is closed through one switch arm 205 of a ganged switch 206. The second switch arm 207 of switch 206 is included in the circuit of the film-advance solenoid 118. Switch 206 is so ganged that both switch arms are either open or closed. The purpose and function of the switch will be more fully explained hereinafter.

A normally closed switch contact $R_1$ is connected in parallel to switch arm 205. This switch contact does not perform any function when switch arm 205 is closed; it is one of three switch contacts of a relay R, the two other switch contacts of the relay being normally open switch contact $R_2$ and normally open switch contact $R_3$.

The starting of film-drive motor 117 has no effect for the time being, but the starting of scanner motor 43 and energization of the loudspeaker system 41 initiate the scanning operation. As soon as the scanning drum begins to rise, as previously described, bottom limit switch 175 closes. Upon completion of the scanning operation, that is, upon completion of the message, notch sensor switch 160 closes by engagement with one of the marginal notches of the film, say notch 36, thereby closing an energizing circuit for relay R. The relay closes its switch contacts $R_2$ and $R_3$ and opens its switch contact $R_1$. The opening of switch contact $R_1$ has no effect upon the operation of the scanner motor which remains energized, due to closed switch arm 205. The closing of switch contact $R_2$ closes energizing circuits for film advance solenoid 190 and scanner solenoid 91, and the closing of switch contact $R_3$ closes a holding circuit for relay R. Energization of solenoid 190 connects the film transport to motor 117, as described, and energization of solenoid 91 releases the drum from its drive, as also previously described. As a result, the film is driven to place the next program in position for presentation, and the scanning drum drops into its lowermost position, in which it re-opens switch 175, thereby interrupting the energizing circuit of relay R. The relay disconnects both solenoids; that is, the film transport is stopped and the scanning drum is reconnected to continuously running scanner motor 43. A new cycle now begins, as described.

It is sometimes desirable to repeat the audio message associated with a projected picture. Such repetition can be effected by opening a switch 208 included in the line connection of film-advance solenoid 190. As is apparent from the previous description, the aforedescribed cycle will be repeated, except for activation of the film transport, which requires energization of solenoid 190, now cut off. Accordingly, the message will be repeated as long as switch 208 is kept open.

Similarly, it is sometimes desirable to hold a projected picture for further discussion, without accompanying sound. This is effected by opening switch 206, which constitutes a hold switch. As is apparent, the opening of switch arm 205 places the scanner motor under the control of relay switch contact $R_1$, thereby disconnecting the scanner motor when and while the relay R is energized. The opening of switch arm 207 disconnects film-advance solenoid 190 and scanner solenoid 91, thereby preventing transport of the film and a return of the scanner drum into its lowermost position.

The system further provides for skipping of programs until a selected program is reached. Such skipping may be effected by closing a normally open push button switch 209. This switch, when closed, maintains relay R energized (provided that holding switch 206 is closed), thereby closing the energizing circuits of solenoids 190 and 91. As a result, the film is transported until switch 209 is released. Sound may be cut off during such transport by opening switch 204.

Finally, top limit switch 176, which is a safety switch, causes energization of relay R and thus initiates dropping of the scanning drum by energizing solenoid 91 when the scanning drum rises high enough to engage switch 176, due to, for instance, a failure of notch-sensor switch 160.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for reproducing sound from a sound record area formed on a strip of film by a plurality of parallel sound track sections, said device comprising, in combination, cylindrically curved stationary guide means for supporting and constraining in a predetermined position a film strip having a sound record area thereon, a scanning assembly including a source of light and optical means for directing a beam of light upon the sound record area supported in said guide means to modulate the light passing through said sound record area in accordance with the sound track sections thereon, said optical means being rotatable about and axially displaceable along the center axis of said guide means, drive means drivingly coupled with said optical means for imparting to the same a combined rotary and axial motion, the rates of said rotary and axial motions being so correlated that said beam sequentially scans said parallel sound track sections, and sound reproducing means, said means including a photoconductive cell having a photosensitive face curved in substantial conformity with the curvature of said guide means and of the sound record area when constrained by the guide means, fastening means supporting said photoconductive cell in an operationally stationary position with the face side thereof facing said guide means and said constrained sound record area in parallel relationship therewith, the modulated light passing through said sound track area striking upon said face of the cell thereby exciting the cell in accordance with the sound track sections, and electromagnetically operated sound producing means connected in circuit with said photoconductive cell for control by the excitation thereof.

2. A device according to claim 1, wherein said photoconductive cell comprises a photosensitive layer composed of a mixture of cadmium sulfide and cadmium selenide.

3. A device according to claim 1, wherein said guide means define a gate for supporting and constraining therein said sound record area, and wherein the photosensitive face of said photoconductive cell has an effective area at least equal to the peripheral outline of said record area.

4. A device according to claim 1, wherein said fastening means comprise support means supporting said photoconductive cell displaceable in reference to said guide means between an operational position closely juxtaposed to said guide means and a film loading position in which the guide means are exposed for accepting the strip of film.

5. A device according to claim 4, wherein said support means comprise guide bars supporting said photoconductive cell at the lower end thereof, said guide bars extending transversely of the center axis of said guide means for displacing said cell in a plane substantially parallel to the general plane of said guide means.

6. A device according to claim 5 and comprising a frame structure releasably mounting said photoconductive cell, said frame structure being slidably supported on said guide bars.

7. A device for reproducing sound from a sound record area formed on a strip of film by a plurality of parallel sound track sections, said device comprising, in combination, a cylindrical housing having a gate in its wall, a guide means for stationarily supporting the strip of film having the sound record area thereon in curved configuration matching the curvature of the housing wall and aligned with said window, a scanning assembly including a lens means, a support means supporting said lens means and mounted in said housing rotatable about and slidable along the center axis of said housing and said guide means, a socket for receiving a light source mounted coaxially with said guide means, said lens means being focused to direct a beam of light incident from a source of light received in said socket upon the sound track sections of the sound record area supported by said guide means, the light passing through the sound record area being modulated in accordance with the sound track sections thereon, drive means drivingly coupled with said support means for imparting to the same and to the lens means simultaneously a rotary motion and an axial motion between an initial axial limit position and a terminal axial limit position relative to said housing and to said guide means whereby said light beams sequentially scans the parallel sound track sections of the sound record area, and sound reproducing means, said means including a photoconductive cell having a photosensitive face curved in substantial conformity with the curvature of the guide means and the sound record area supported by the guide means, fastening means supporting said photoconductive cell in alignment with said gate in the housing wall in an operationally stationary position in which the face side of the cell faces said sound record area in a substantially parallel relationship therewith, the modulated light passing through said sound record area striking upon said face thereby exciting said cell, and electromagnetically operated sound reproducing means connected in circuit with said photoconductive cell for control by the excitation thereof.

8. A device according to claim 7, wherein the peripheral outline of said photosensitive face of the cell is at least equal to the peripheral outline of said sound record area.

References Cited
UNITED STATES PATENTS

| | | | |
|---|---|---|---|
| 2,136,209 | 11/1938 | Finch | 179—100.3 X |
| 3,001,444 | 9/1961 | Castedello et al. | 179—100.3 X |
| 3,108,160 | 10/1963 | Maurer | 179—100.3 |
| 3,243,522 | 3/1966 | Maurer | 179—100.3 |

BERNARD KONICK, *Primary Examiner.*

RAYMOND F. CARDILLO, JR., *Assistant Examiner.*

U.S. Cl. X.R.

88—28